United States Patent

Hoffmann et al.

[15] 3,691,205

[45] Sept. 12, 1972

[54] PRODUCTION OF 6-ALKOXY-5,6-DIHYDRO-4H-PYRANS

[72] Inventors: Herwig Hoffmann, 21 Knietschstrasse, 6710 Frankenthal; Gerhard Jeschek, 54 Pfortmuellerstrasse, 6718 Gruenstadt; Alfred Kuerzinger, 11 Weinbiestrasse, 6703 Limburgerhof; Erwin Schmidt, 21 Brunckstrasse, 6710 Frankenthal; Willibald Schoenleben, 4 Gugenmus-Weg, 6900 Heidelberg; Dieter Voges, 28 Richard-Wagner-Strasse, 6800 Mannheim; Siegfried Winderl, 27 Viernheimer Weg, 6900 Heidelberg, all of Germany

[22] Filed: Feb. 9, 1971

[21] Appl. No.: 113,888

[52] U.S. Cl. .................260/345.9, 260/602, 8/94.33

[51] Int. Cl. ..............................................C07d 7/10

[58] Field of Search..................................260/345.9

[56] References Cited

UNITED STATES PATENTS

| | | | |
|---|---|---|---|
| 2,619,491 | 11/1952 | Smith | 260/345.9 |

FOREIGN PATENTS OR APPLICATIONS

| | | | |
|---|---|---|---|
| 546,720 | 9/1957 | Canada | 260/345.9 |
| 653,764 | 5/1951 | Great Britain | 260/345.9 |

*Primary Examiner*—Norma S. Milestone
*Attorney*—Johnston, Root, O'Keeffe, Keil, Thompson & Shurtleff

[57] ABSTRACT

A process for the production of 6-alkoxy-5,6-dihydro-4H-pyrans by reaction of $\alpha,\beta$-unsaturated aldehydes with vinyl ethers. The products are valuable intermediates, for example for the production of glutaraldehyde or substituted glutaraldehydes which may be used for example as tanning agents for leather.

8 Claims, 1 Drawing Figure

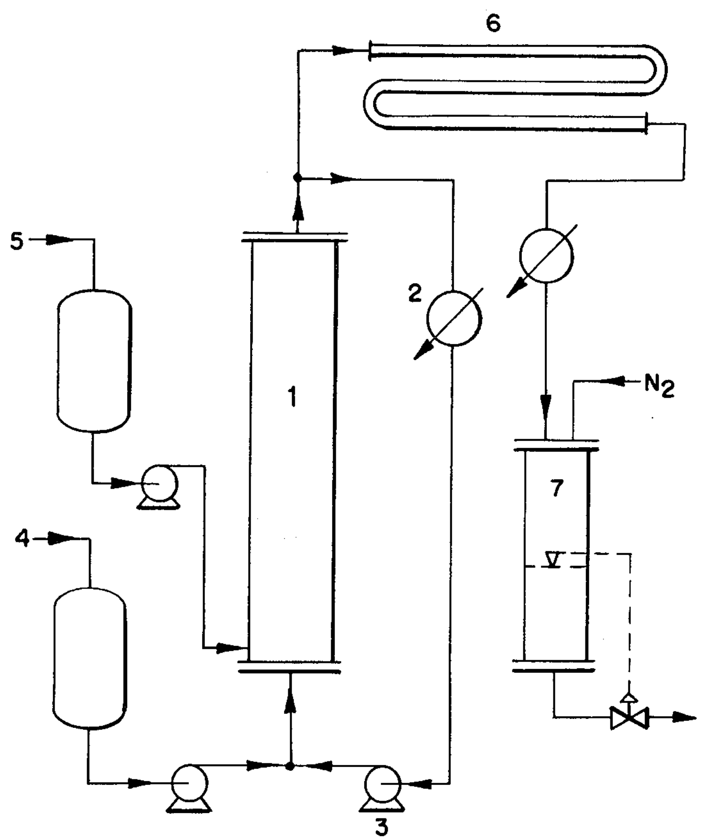
INVENTORS:
HERWIG HOFFMANN
GERHARD JESCHEK
ALFRED KUERZINGER
ERWIN SCHMIDT
WILLIBALD SCHOENLEBEN
DIETER VOGES
SIEGFRIED WINDERL
BY
Johnston, Root, O'Keeffe, Keil, Thompson & Shurtleff
ATT'YS

PRODUCTION OF 6-ALKOXY-5,6-DIHYDRO-4H-PYRANS

The present invention relates to a process for the production of 6-alkoxy-5,6-dihydro-4H-pyrans by reaction of $\alpha,\beta$-unsaturated aldehydes with vinyl ethers.

It is known, for example from German Pat. No. 977,093, that $\alpha,\beta$-unsaturated aldehydes and vinyl ethers may be reacted by a batch method to form 6-alkoxy-5,6-dihydro-4H-pyrans. Since the $\alpha,\beta$-unsaturated aldehydes used as starting materials readily polymerize, however, an expensive control of the temperature of the reaction is necessary to achieve satisfactory yields. Moreover the conversions achieved according to the prior art methods are not satisfactory.

It is an object of this invention to provide a new process for producing 6-alkoxy-5,6-dihydro-4H-pyrans in good yields, purity and space-time yields.

We have found that 6-alkoxy-5,6-dihydro-4H-pyrans having the general formula:

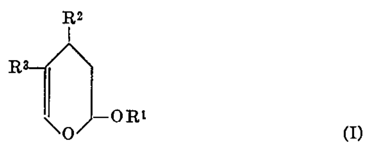

(I)

where $R^1$ denotes an unsubstituted or substituted aliphatic or aromatic hydrocarbon radical and $R^2$ and $R^3$ each denotes a hydrogen atom or an aliphatic hydrocarbon radical and may be identical or different may be prepared advantageously by Diels-Alder reaction of an $\alpha,\beta$-unsaturated aldehyde having the general formula:

$$CR^2 = CR^3\text{—}CHO \qquad (II)$$

where $R^2$ and $R^3$ have the meanings given above with a vinyl ether having the general formula:

$$CH_2 = CH\text{—}OR^1 \qquad (III)$$

where $R^1$ has the meanings given above, at elevated temperature when in a continuous method the reaction is first carried out in a recycle apparatus, the weight ratio of the starting materials supplied per unit time to the reaction mixture recycled per unit time is from 1:4 to 1:20, and thereafter the reaction mixture leaving the recycle apparatus is supplied to a reactor in which no circulation of the reaction mixture takes place and in which the reaction is completed.

Yields of about 90 percent of 6-alkoxy-5,6-dihydro-4 H-pyrans are achieved at conversions of about 95 percent in the new process and the amount of polymers or high boiling products does not as a rule exceed 2 to 3 percent. Considerably higher space-time yields are obtained than in prior art methods.

When $R^2$ and $R^3$ in the $\alpha,\beta$-unsaturated aldehydes to be used as starting materials denote aliphatic hydrocarbon radicals they preferably contain contain up to three carbon atoms. Examples of suitable starting materials (II) are crotonaldehyde, methacrolein, $\alpha$-ethyl-acrolein and particularly acrolein.

When $R^1$ in the vinyl ether (III) is an aliphatic hydrocarbon radical, it is preferred that it should contain not more than four carbon atoms. The aliphatic hydrocarbon radical $R^1$ may contain inert substituents such as alkoxy groups preferably having up to four carbon atoms or halogen atoms and/or may be olefinically unsaturated. When $R^1$ is an aromatic hydrocarbon radical, the aromatic ring preferably contains six carbon atoms and $R^1$ may contain inert substituents such as alkyl or alkoxy groups preferably having up to four carbon atoms or halogen atoms, for example chlorine or bromine atoms. Examples of suitable vinyl ethers are methyl vinyl ether, ethyl vinyl ether, butyl vinyl ether, 2-methylhexyl vinyl ether, divinyl ether and phenyl vinyl ether. The molar ratio of $\alpha,\beta$-unsaturated aldehyde (II) and vinyl ether (III) is generally from 1:1 to 1:1.3, preferably from 1:1 to 1:1.1.

The reaction may be carried out in the presence of solvents, for example in aromatic hydrocarbons such as benzene, toluene and xylene. It is of particular advantage however to carry out the reaction in the absence of solvents.

The reaction temperatures used are generally from 120° to 240° C., preferably from 130° to 190° C. The reaction is generally carried out under the autogenous pressure set up in the reaction vessel as the sum of the partial pressures of the reactants. It is possible however to use higher pressures, for example up to 200 atmospheres, or lower pressures.

The reaction is preferably carried out in the presence of polymerization inhibitors. The conventional inhibitors such as hydroquinone or p-methoxyphenyl, are used as polymerization inhibitors for the process. The inhibitors are preferably used in amounts of from 0.05 to 1 percent, particularly from 0.1 to 0.5 percent by weight with reference to the reaction mixture.

The process is carried out continuously. It is an essential feature of the invention that the reaction is first carried out in a circulation apparatus in which the reaction mixture is recycled, and the reaction is thereafter completed in a reactor in which no circulation of the reaction mixture takes place.

A suitable recycle apparatus consists for example of a reactor from which some of the reaction time is withdrawn and returned to the reactor, if necessary after having been cooled. The recycle apparatus also includes feed pipes for the starting materials and an outlet pipe for the reaction mixture to be fed into the subsequent reactor (cf. the drawing). The starting materials may be first mixed and the mixture fed to the reaction zone. It is also possible to feed in the starting materials at separate places of the reaction zone. The starting materials are preferably fed in by mixing the vinyl ether with the recycled reaction mixture prior to entry into the reactor and the $\alpha,\beta$-unsaturated aldehyde is passed direct into the reactor. The starting materials are conveniently fed in using measures which ensure effective mixing of the starting materials with the reaction mixture, for example by using an efficient mixing nozzle. It is advantageous to maintain a reaction temperature of from 120° to 190° C., preferably from 130° to 180° C., in the reactor of the recycle apparatus. The recycled reaction mixture is advantageously cooled to a temperature which is lower than the reaction temperature. The temperature of the reaction mixture returned to the reaction zone is however preferably not more than 50° C and particularly not more than 20° C. below the reaction temperature. The ratio by weight of the starting materials supplied per unit time to the amount of reaction mixture circulating per unit time is from 1:4 to 1:20, preferably from 1:6 to 1:12.

The reaction mixture leaving the recycle apparatus preferably contains (with reference to the sum of starting materials and end product) at least 40 percent by weight and particularly 50 to 75 percent by weight of end product. To complete the reaction, the reaction mixture leaving the recycle apparatus is fed into a reactor in which no circulation of the reaction mixture takes place. The reactor devoid of circulation used is preferably a tubular reactor, i.e., a reactor consisting substantially of one or more than one reaction tube. In an advantageous embodiment of the process provision is made that substantial back-mixing of reaction mixture having a higher degree of reaction with that having a lower degree of reaction does not take place in the second reactor. To avoid backmixing, the ratio of the reaction mixture flowing through the second reactor (in $m^3$ per hour) to the cross-sectional area of the reactor (in $m^2$) is generally fixed at from 50 to 100, and at the same time the volume of the second reactor amounts to 15 to 40 percent, particularly 25 to 30 percent of the volume of the reactor in the recycle apparatus. The reaction temperature used in the second reactor is from 5° TO 50° C., particularly 10° to 30° C., higher than that in the recycle apparatus.

It is advantageous to carry out the reaction in the presence of an inert gas such as carbon dioxide, argon and particularly nitrogen in order to avoid secondary reactions.

The reaction mixture is preferably worked up by fractional distillation. In some cases it is possible however to use the reaction mixture for other reactions without having been worked up.

The 6-alkoxy-5,6-dihydro-4H-pyrans obtained according to the invention are valuable intermediates, for example for the production of glutaraldehyde or substituted glutaraldehydes which may be used for example as tanning agents for leather. Glutaraldehyde may be obtained for example by continuous hydrolysis with dilute aqueous acids.

The following Examples illustrate the invention.

EXAMPLE 1

The reaction apparatus (see drawing) consists of a recycle reactor 1 having a capacity of 57 liters and a length of 6 meters. Some of the reaction mixture is withdrawn at the upper end of the reactor and returned to the lower end of the reactor after it has passed through a cooler 2 and a pump 3. Vinyl ether 4 is mixed with the recycled reaction mixture prior to its entry into the reactor, while the $\alpha,\beta$-unsaturated aldehyde 5 is mixed with the reaction mixture in the reactor. Some of the reaction mixture is withdrawn at the top of the reactor and fed into a downstream tubular reactor 6 (having a length of 36 meters and a volume of 16 liters). The reaction is carried out under an atmosphere of nitrogen, the pressure in the reaction apparatus being 100 atmospheres. The reaction product leaving the second reactor is first transferred to a separator 7 and then released into a tank.

In carrying out the reaction, 37 kg per hour of isobutyl vinyl ether and20 kg per hour of acrolein (molar ratio 1.04:1) containing 0.25 percent by weight of hydroquinone is fed into the recycle reactor 1. The total residence time is 1 hour. 500 liters of reaction mixture is circulated per hour in the recycle apparatus. The temperature in the inlet of the recycle reactor is 160° C., the temperature at the outlet being 170° C. The reaction temperature in the tubular reactor 6 is 180° C. The product leaving the recycle reactor 1 contains 53.3 percent of starting material and 45.5 percent of 6-isobutoxy-5,6-dihydro-4H-pyran as well as 1.2 percent of residue. The reaction mixture leaving the tubular reactor 6 is fractionally distilled, isobutoxydihydropyran being obtained in a yield of 88.5 percent. The residue is only 2.2 percent. Conversion is 95 percent with reference to the acrolein used.

EXAMPLE 2

23 kg of methyl vinyl ether and 21.5 kg of acrolein are reacted per hour in the apparatus described in Example 1. This is a molar ratio of 1.03:1. 400 liters per hour of reaction mixture is recycled. The inlet temperature in the recycle reactor is 145° C. and the outlet temperature is 155° C. The reaction temperature in the tubular reactor is 170° C. Reaction is carried out under a nitrogen atmosphere at a pressure of 150 atmospheres. The reaction mixture leaving the first reactor 1 contains 58.4 percent of starting material, 40.2 percent of methoxydihydropyran and 1.4 percent of residue. The reaction product leaving the second reactor is fractionally distilled. 6-methoxy-5,6-dihydro-4H-pyran is obtained in a yield of 88.8 percent. The conversion is 97 percent with reference to acrolein and the amount of residue of highly polymerized substances is 3.0 percent.

When methyl vinyl ether and acrolein are reacted batchwise in the said molar ratio (1.03:1), 6-methoxy-5,6-dihydro-4H-pyran is obtained in a yield of 82 percent only at a reaction period of 2 hours at 180° C.

We claim:

1. A process for the production of 6-alkoxy-5,6-dihydro-4H-pyrans having the general formula:

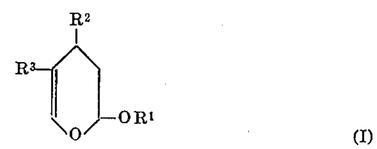

(I)

wherein $R^1$ denotes an unsubstituted or substituted aliphatic or aromatic hydrocarbon radical and $R^2$ and $R^3$ each denotes a hydrogen atom or an aliphatic hydrocarbon radical and they may be identical or different, by Diels-Alder reaction of an $\alpha,\beta$-unsaturated aldehyde having the general formula:

$$CR^2 = CR^3\text{—}CHO \qquad (II)$$

in which $R^2$ and $R^3$ have the meanings given above with a vinyl ether having the general formula:

$$CH_2 = CH\text{—}OR^1 \qquad (III)$$

in which $R^1$ has the meanings given above, at elevated temperature wherein in continuous operation the reaction is first carried out in a recycle apparatus in which the ratio by weight of starting materials supplied per unit time to the reaction mixture recycled per unit time is from 1:4 to 1:20, and the reaction mixture leaving the recycle apparatus is supplied to a reactor in which the reaction mixture is not circulated in order to complete the reaction.

2. A process as claimed in claim 1 wherein the reaction mixture leaving the recycle apparatus contains at least 40 percent by weight of end product with reference to the sum of starting materials and end product.

3. A process as claimed in claim 1 wherein the reaction temperature in the second reactor is up to 50° C. higher than the reaction temperature in the recycle apparatus.

4. A process as claimed in claim 1 wherein the reaction is carried out with a molar ratio of $\alpha,\beta$-unsaturated aldehyde (II) to vinyl ether (III) of from 1:1 to 1:1.1.

5. A process as claimed in claim 1 wherein the reaction is carried out in the presence of a solvent.

6. A process as claimed in claim 1 wherein the reaction is carried out at a temperature of room 120° to 240° C.

7. A process as claimed in claim 1 wherein the reaction is carried out at a temperature of from 130° to 190° C.

8. A process as claimed in claim 1 wherein the reaction is carried out in the presence of a polymerization inhibitor in an amount of from 0.1 to 0.5 percent by weight with reference to the reaction mixture.

* * * * *

FO-1050
(5/69)

UNITED STATES PATENT OFFICE
CERTIFICATE OF CORRECTION

Patent No. 3,691,205 Dated September 12, 1972

Inventor(s) Hoffmann et al

It is certified that error appears in the above-identified patent and that said Letters Patent are hereby corrected as shown below:

Cover page, left hand column, insert
-- [73] ASSIGNEE: Badische Anilin -& Soda-Fabrik Aktiengesellschaft, Ludwigshafen am Rhein, Germany --

Column 2, line 38, Specification P.3 L.23
"time"should read -- mixture --

Column 6, line 2 of Claim 6
"room" should read -- from --

Signed and sealed this 17th day of April 1973.

(SEAL)
Attest:

EDWARD M.FLETCHER,JR.
Attesting Officer

ROBERT GOTTSCHALK
Commissioner of Patents